(12) United States Patent
Ohodnicki et al.

(10) Patent No.: US 12,736,705 B2
(45) Date of Patent: Sep. 15, 2026

(54) DISTRIBUTED ELECTROMAGNETIC INTERROGATION SYSTEM

(71) Applicant: United States Department of Energy, Washington, DC (US)

(72) Inventors: Paul R. Ohodnicki, Allison Park, PA (US); Jagannath Devkota, Pittsburgh, PA (US); Roman Shugayev, Albuquerque, NM (US); Ruishu Wright, Pittsburgh, PA (US)

(73) Assignee: United States Department of Energy, Washington, DC (US)

( * ) Notice: Subject to any disclaimer, the term of this patent is extended or adjusted under 35 U.S.C. 154(b) by 212 days.

(21) Appl. No.: 18/636,431

(22) Filed: Apr. 16, 2024

(65) Prior Publication Data

US 2025/0321349 A1 Oct. 16, 2025

(51) Int. Cl.

| | |
|---|---|
| ***G01V 3/30*** | (2006.01) |
| ***E21B 47/13*** | (2012.01) |
| ***E21B 49/00*** | (2006.01) |
| ***H01Q 1/36*** | (2006.01) |

(52) U.S. Cl.
CPC ................ *G01V 3/30* (2013.01); *E21B 47/13* (2020.05); *E21B 49/00* (2013.01); *H01Q 1/36* (2013.01)

(58) Field of Classification Search
USPC .......................................................... 324/338
See application file for complete search history.

(56) References Cited

U.S. PATENT DOCUMENTS

| | | | |
|---|---|---|---|
| 7,526,944 B2 | 5/2009 | Sabata et al. | |
| 7,730,968 B2 | 6/2010 | Hosie et al. | |
| 8,855,947 B2 | 10/2014 | Sheila-Vadde et al. | |
| 9,547,104 B2 | 1/2017 | Coates et al. | |
| 9,803,466 B2 | 10/2017 | Donderici | |
| 11,113,594 B2 * | 9/2021 | Ohodnicki | H01Q 1/2216 |
| 11,262,289 B1 | 3/2022 | Ohodnicki, Jr. et al. | |
| 11,513,100 B2 | 11/2022 | Wilmer et al. | |
| 2011/0215984 A1 | 9/2011 | Coburn et al. | |
| 2015/0167452 A1 | 6/2015 | Godager et al. | |
| 2016/0053595 A1 | 2/2016 | Nguyen et al. | |

(Continued)

OTHER PUBLICATIONS

Shugayev, R. ., Devkota, J. . & Ohodnicki, P. ., "Conformal coaxial helical antenna for distributed sensing applications at wellbores", Review of Progress in Quantitative Nondestructive Evaluation, (Dec. 3, 2019) [retrieved on Feb. 28, 2024]. Retrieved from the Internet: <URL: https://www.iastatedigitalpress.com/qnde/article/id/8532/>.

(Continued)

*Primary Examiner* — Farhana A Hoque
(74) *Attorney, Agent, or Firm* — Andrew C. Stark; Aaron R. Keith

(57) ABSTRACT

A distributed electromagnetic interrogation system may include a wellbore, a wellbore casing positioned in the wellbore, and a plurality of conformal helical antennas distributed along the wellbore casing. The plurality of conformal helical antennas may be configured to operate in a radio or microwave frequency range and to propagate electromagnetic radiation along an external propagating mode of the wellbore casing. An interrogator may be coupled to receive and process data from the plurality of conformal helical antennas.

19 Claims, 6 Drawing Sheets

(56) References Cited

U.S. PATENT DOCUMENTS

| | | | | |
|---|---|---|---|---|
| 2016/0116626 | A1* | 4/2016 | Okonkwo ............. | G01V 13/00<br>324/333 |
| 2024/0201162 | A1* | 6/2024 | Fouda ................... | G01N 33/28 |

OTHER PUBLICATIONS

Elmore, Glenn, "Introduction to the Propagating Wave on a Single Conductor" (Jul. 27, 2009) [retrieved on Feb. 28, 2024]. Retrieved from the Internet: <URL: http://www.corridor.biz/FullArticle.pdf>.
Babarinde, O., Okwen, R., Frailey, S., Yang, F., Whittaker, S., & Sweet, D. (Jul. 2021), "A workflow to assess the efficacy of brine extraction for managing injection-induced seismicity potential using data from a CO2 injection site near Decatur, Illinois", International Journal of Greenhouse Gas Control, 109, Article 103393. https://doi.org/10.1016/j.ijggc.2021.103393.
Bahl, Inder J. "A designer's guide to microstrip line." Microwaves, 1977 [retrieved on Feb. 28, 2024]. Retrieved from the Internet: <URL: https://vdocument.in/download/a-designers-guide-to-microstrip-line.html>.
Sun, Jin, et al. "Characterizing helical microstrip antenna mounted on a dielectric-coated circular cylinder using MoM and closed-form Green's function." IEEE Antennas and Wireless Propagation Letters, vol. 3, 2004, p. 15-18 [retrieved on Feb. 29, 2024]. Retrieved from the Internet: <URL: https://www.researchgate.net/publication/224747401_Characterizing_Helical_Microstrip_Antenna_Mounted_on_a_Dielectric-Coated_Circular_Cylinder_Using_MoM_and_Closed-Form_Green%27s_Function>.
Sweeney, J, Roberts, J, and Harben, P., "A Study of the Dielectric Properties of Dry and Saturated Green River Oil Shale," United States, 2007, https://doi.org/10.1021/ef070150w, https://www.osti.gov/servlets/purl/919595.
Baker-Jarvis, J., Janezic, M., Riddle, B., Johnk, R., Kabos, P., Holloway, C., Geyer, R. and Grosvenor, C., Measuring the Permittivity and Permeability of Lossy Materials: Solids, Liquids, Metals, Building Materials, and negative-Index Materials, Technical Note (NIST TN)—1536, National Institute of Standards and Technology, Gaithersburg, MD, 2005.
Lee K, Hassan A, Lee CH, Bae J. Microstrip Patch Sensor for Salinity Determination. Sensors (Basel). Dec. 18, 2017;17(12):2941. doi: 10.3390/s17122941. PMID: 29258273; PMCID: PMC5751091.
Sweety Jain, Pankaj Kumar Mishra, Vandana Vikas Thakery, and Jyoti Mishra, "Microstrip Moisture Sensor Based on Microstrip Patch Antenna," Progress In Electromagnetics Research M, vol. 76, 177-185, 2018. doi:10.2528/PIERM18092602.
A. Darwish, A. Ezzeddine, H. C. Huang and M. Mah, "Properties of the embedded transmission line (ETL)—an offset stripline with two dielectrics," in IEEE Microwave and Guided Wave Letters, vol. 9, No. 6, pp. 224-226, Jun. 1999, doi:10.1109/75.769528.
P. V. Nikitin, D. D. Arumugam, M. J. Chabalko, B. E. Henty and D. D. Stancil, "Long Range Passive UHF RFID System Using HVAC Ducts," in Proceedings of the IEEE, vol. 98, No. 9, pp. 1629-1635, Sep. 2010, doi: 10.1109/JPROC.2010.2047821.
Arumugam, D. & Engels, Daniel. (2007). Characterisation of RF propagation in metal pipes for passive RFID systems. IJRFITA. 1. 303-343. 10.1504/IJRFITA.2007.015853.
R. J. Allard, D. H. Werner and J. S. Zmyslo, "A domain-decomposition/reciprocity technique for the analysis of arbitrarily-shaped dielectric-loaded microstrip antennas mounted on circularly-cylindrical platforms," IEEE Antennas and Propagation Society International Symposium. Transmitting Waves of Progress to the Next Millennium. 2000 Digest. Held in conjunction with: USNC/URSI National Radio Science Meeting (C, Salt Lake City, UT, USA, 2000, pp. 2-5 vol.1, doi: 10.1109/APS.2000.873691.
Peterson, Andrew F., Bruce S. Greene, and Raj Mittra. "Propagation and radiation characteristics of the tape helix with a conducting core and dielectric substrate." IEEE transactions on antennas and propagation 38.4 (1990): 578-584.
Williams-Stroud, S.; Neuhaus, C.W.; Telker, C.; Remington, C.; Barker, W.; Neshyba, G.; Blair, K. Temporal Evolution of Stress States from Hydraulic Fracturing Source Mechanisms in the Marcellus Shale. SPE Can. Unconv. Resour. Conf. 2012, SPE 162786.

* cited by examiner

DISTRIBUTED ELECTROMAGNETIC INTERROGATION SYSTEM

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

Embodiments of the invention relate to distributed electromagnetic interrogation systems. More specifically, embodiments of the invention relate to conformal antenna distributed on a wellbore casing for interrogation of an underground environment.

BACKGROUND

In the fields of industrial and wireless sensing, communication channels used for telemetry often determine the characteristics and performance of the sensing network. For wellbore and geothermal monitoring applications, telemetry challenges are particularly acute due to (1) harsh environmental conditions (high temperature and pressure, chemical corrosion, etc.) which can restrict the application of complex electronics and instrumentation, and (2) inherent absorption of electromagnetic radiation within the subsurface environment which can severely limit the potential for free space wireless power and signal delivery over significant distances. High absorption of electromagnetic radiation in the subsurface environment is directly linked to high water content, which can lead to short decay lengths for wireless sensor telemetry.

Well logging, also referred to as borehole logging, is the practice of making a detailed record of geologic formations penetrated by a borehole. Existing well-logging tools are often lowered into the borehole as a one-time scan between operations (e.g. between phases of the well including drilling, completing, producing, or abandoning the well). For continuous imaging of a wellbore environment, ground-penetrating radar (GPR) is often used which involves radiating electromagnetic (EM) waves and recording the reflections using surface-based sensor systems. The radiated EM waves have limited surface penetration depth to a few meters below the surface. Lower frequency acoustic systems can offer higher penetration depth but they usually require compromises in resolution. One method to monitor the integrity of a wellbore casing in the wellbore in real-time involves depositing passive and wireless sensors inside of the casing that communicate with an interrogator to signal the sensors and process data received therefrom.

Another potential deployment scheme for wireless and passive sensors is to position them throughout the wellbore in the wellbore cement and on the exterior of a wellbore casing. However, the challenges of wireless telemetry greatly complicate the system design and have historically precluded deployment. One approach to microwave telemetry being investigated for such demanding applications is the implementation of a dedicated guiding channel for long-haul telemetry with distributed antennas for short-distance wireless links with deployed sensors. This approach retains much of the advantages inherent with truly free-space wireless sensor networks such as mitigating the need for active electronics in the high temperature and pressure subsurface environment. Unfortunately, radiation escapes the region in the immediate vicinity of the free space antenna and is unconfined—thus interaction of sensors with EM radiation is limited and inefficient.

Therefore, it would be desirable to provide a distributed wireless sensor system throughout a wellbore that could ensure safe and productive operation of the well, real-time imaging of the wellbore environment, and minimize hazardous environmental impacts on the sensor system and wellbore casing. It would be further desirable to monitor geological conditions surrounding the wellbore in the subsurface environment at a depth below conventional subsurface imaging techniques.

SUMMARY

In accordance with one aspect of the invention, a distributed electromagnetic interrogation system includes a wellbore, a wellbore casing positioned in the wellbore, and a plurality of conformal helical antennas distributed along the wellbore casing. The plurality of conformal helical antennas may be configured to operate in a radio or microwave frequency range and to propagate electromagnetic radiation along an external propagating mode of the wellbore casing. An interrogator may be coupled to receive and process data from the plurality of conformal helical antennas.

In accordance with another aspect of the invention, a system for interrogating an underground environment includes a borehole, a metallic tube extending down the borehole, a plurality of microstrip antennas mounted on and distributed along the metallic tube, a plurality of wireless sensors distributed down the borehole, and a source of electromagnetic energy positioned above or near ground level and operable for transmitting electromagnetic energy to the plurality of microstrip antennas. The plurality of microstrip antennas may radiate the electromagnetic energy to interrogate the plurality of wireless sensors, with the plurality of wireless sensors re-emitting the electromagnetic energy to the plurality of microstrip antennas. The plurality of microstrip antennas may transmit data on the re-emitted electromagnetic energy to the source.

In accordance with yet another aspect of the invention, a system for interrogating a subsurface environment includes a casing lined borehole, a source of electromagnetic energy positionable aboveground and operable for generation of an electromagnetic energy signal, and a plurality of microstrip antennas mounted on the outer surface of the casing and connected to the source of electromagnetic energy via the internal guided modes of the casing. The plurality of microstrip antennas may be configured to receive and radiate the electromagnetic energy signal via the external guided modes of the casing to the subsurface environment and receive re-emitted electromagnetic energy therefrom, and a signal analyzer may be in data connection with the plurality of microstrip antennas.

These and other advantages and features of the present invention will be more readily understood from the following detailed description and accompanying drawings.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION

The foregoing summary, as well as the following detailed description of certain embodiments of the present invention, will be better understood when read in conjunction with the appended drawings.

The following detailed description should be read with reference to the drawings in which similar elements in different drawings are numbered the same. The drawings, which are not necessarily to scale, depict illustrative embodiments and are not intended to limit the scope of the invention.

The operating environment of the invention is described herein with respect to distributed interrogation of a wellbore and surrounding environment. However, those skilled in the art would appreciate that the invention is equally applicable for use in distributed interrogation of other subsurface or aboveground environments. Furthermore, while the invention is described with respect to conformal helical antennas used in sensing networks, embodiments of the invention are equally applicable to sensing networks using helical antennas that are not conformal antennas.

Figure 1:
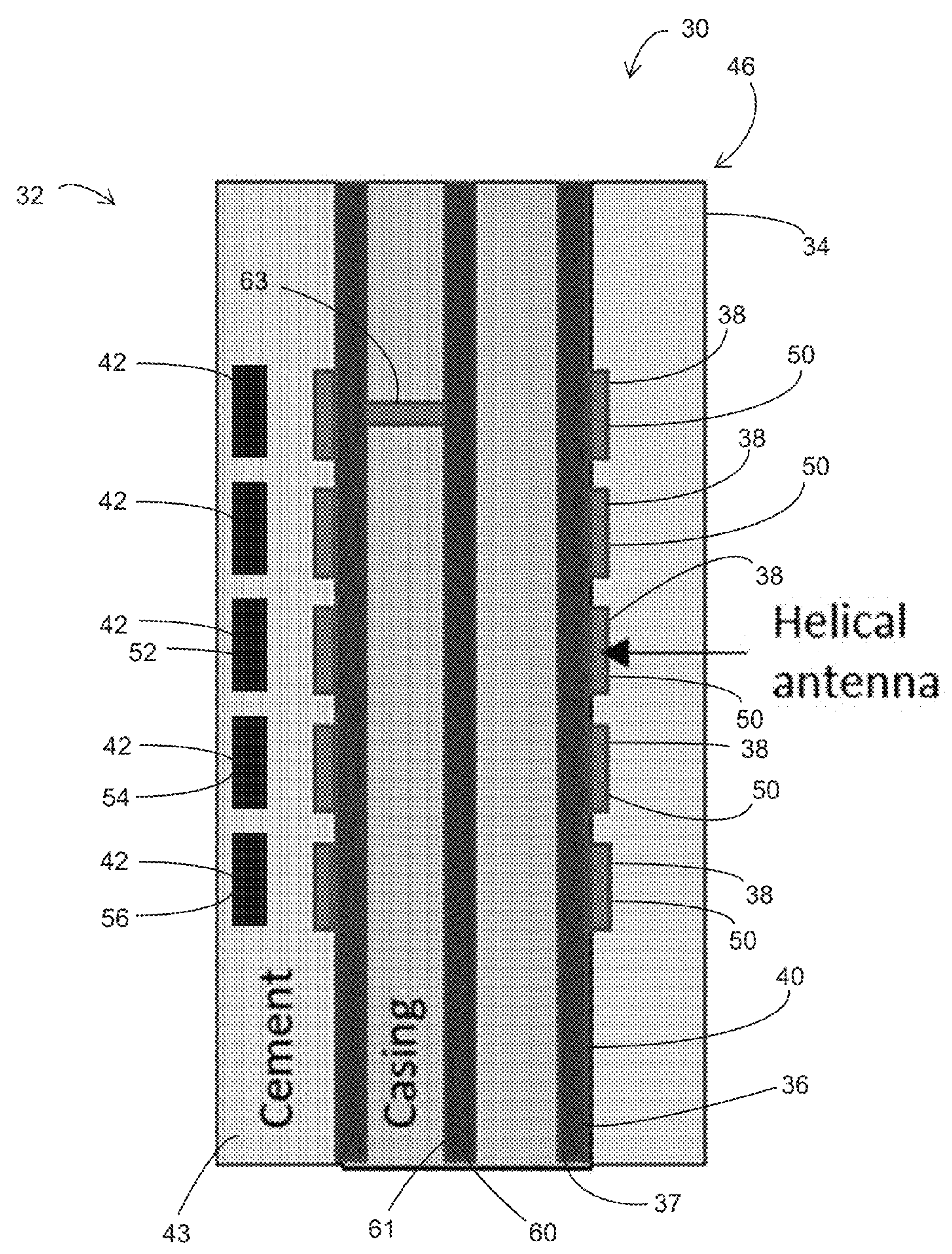
FIG. 1 is a cross-sectional view of a distributed electromagnetic interrogation system for interrogating an underground environment including helical antennas wound around a wellbore casing and sensors embedded in wellbore cement, according to embodiments of the invention.

Referring to FIG. 1, a cross-sectional view of a distributed electromagnetic interrogation system 30 for interrogating an underground environment 32 is shown, according to embodiments of the invention. The distributed electromagnetic interrogation system 30 may include a wellbore 34 (also referred to as a borehole), a wellbore casing 36 positioned in the wellbore 34, and one or more conformal helical antennas 38 distributed along the wellbore casing 36, with the cross-sectional view taken vertically through the well. The wellbore casing 36 is a metallic or steel tube 40 extending down the wellbore 34 with the helical antennas 38 wound around and distributed along the metallic tube 40. The distributed electromagnetic interrogation system 30 may include wellbore cement 43 surrounding the wellbore casing 36 in the wellbore 34 and one or more wireless sensors 42 distributed down the wellbore 34 and embedded into the wellbore cement 43.

According to embodiments of the invention, the helical antennas 38 are configured to operate in a radio or microwave frequency range. The helical antennas 38 may include helical microstrip antennas 50 wound on the wellbore casing 36 with the casing serving as a channel for long haul power and signal delivery as well as external mode guiding of the emitted antenna signals. The helical microstrip antennas 50 may be distributed along the wellbore casing 36 to at least one kilometer below ground level 46.

According to embodiments of the invention, passive and wireless sensors 42 are distributed throughout the wellbore 34 and the helical antennas 38 radiate electromagnetic energy (also referred to as electromagnetic radiation, current, or signals) to interrogate the wireless sensors 42. The wireless sensors 42 may include passive resonating circuits that modulate the electromagnetic energy in response to an environmental condition in the subsurface environment and re-emit the modulated electromagnetic energy to the helical antennas 38. The sensors 42 may include surface acoustic wave (SAW) sensors 52, solid state sensors 54, or microwave resonant sensors 56. The sensors 42 re-emit the electromagnetic energy with a modification in (1) amplitude, (2) phase, and/or (3) frequency spectrum, according to embodiments of the invention. After the sensors 42 re-emit electromagnetic energy, the helical antennas 38 receive the re-emitted electromagnetic energy.

According to embodiments of the invention, the helical antennas 38 can be used for distributed interrogation of the wellbore 34 and geothermal environment RF/electromagnetic property characteristics directly at penetration depths not previously possible. The helical antennas 38 are integrated periodically on the wellbore casing 36 which acts as a waveguide 37 that increases power transfer and facilitates ease of installation into the wellbore 34. In addition, conformal antennas distributed on the wellbore casing 36 could be designed to convert the electromagnetic radiation into propagating external modes of the wellbore casing 36. As a result, the helical antennas 38 may couple radiation to the external propagating mode of the wellbore casing 36 with controllable directionality and magnitude. Therefore, radio frequency (RF) energy can be directed to the region surrounding the wellbore casing 36 and sensors 42 embedded in the wellbore cement 43 can efficiently absorb that energy, instead of the energy being freely radiated and lost like with conventional free space antennas.

Due to their conformal profile, the helical antennas 38 have a very small added form factor—that is they have minimal perturbation to the geometry of the wellbore casing 36. A small added form factor is beneficial for deployment applications in solid underground environments where a desire exists to minimize the impact of telemetry devices on potential leakage paths in the wellbore 34 and on failure mechanisms of wellbore materials such as wellbore cement 43. Traditional free space antennas mounted to the wellbore casing 36 or coupled to a telemetry cables in the wellbore 34 could jeopardize the integrity of the casing and lead to abandonment of the well. For example, traditional free space antennas mounted to the wellbore casing 36 would protrude from the casing thereby impeding the wellbore cementing process and impacting integrity of the wellbore 34. In addition, the helical antennas 38 may be configured for ease of installation on the wellbore casing 36 and insertion into the wellbore.

FIG. 1 also shows a pump component 60 positioned in the wellbore casing 36, according to embodiments of the invention. The pump component 60 is shown as a rod string 61 used to power a rod pump from a reciprocating power source located aboveground. FIG. 1 also shows a helical antenna 38 comprising a probe 63 extending through an opening into the wellbore casing 36 to couple to the internal guided mode of the wellbore casing, according to embodiments of the invention.

Figure 2:
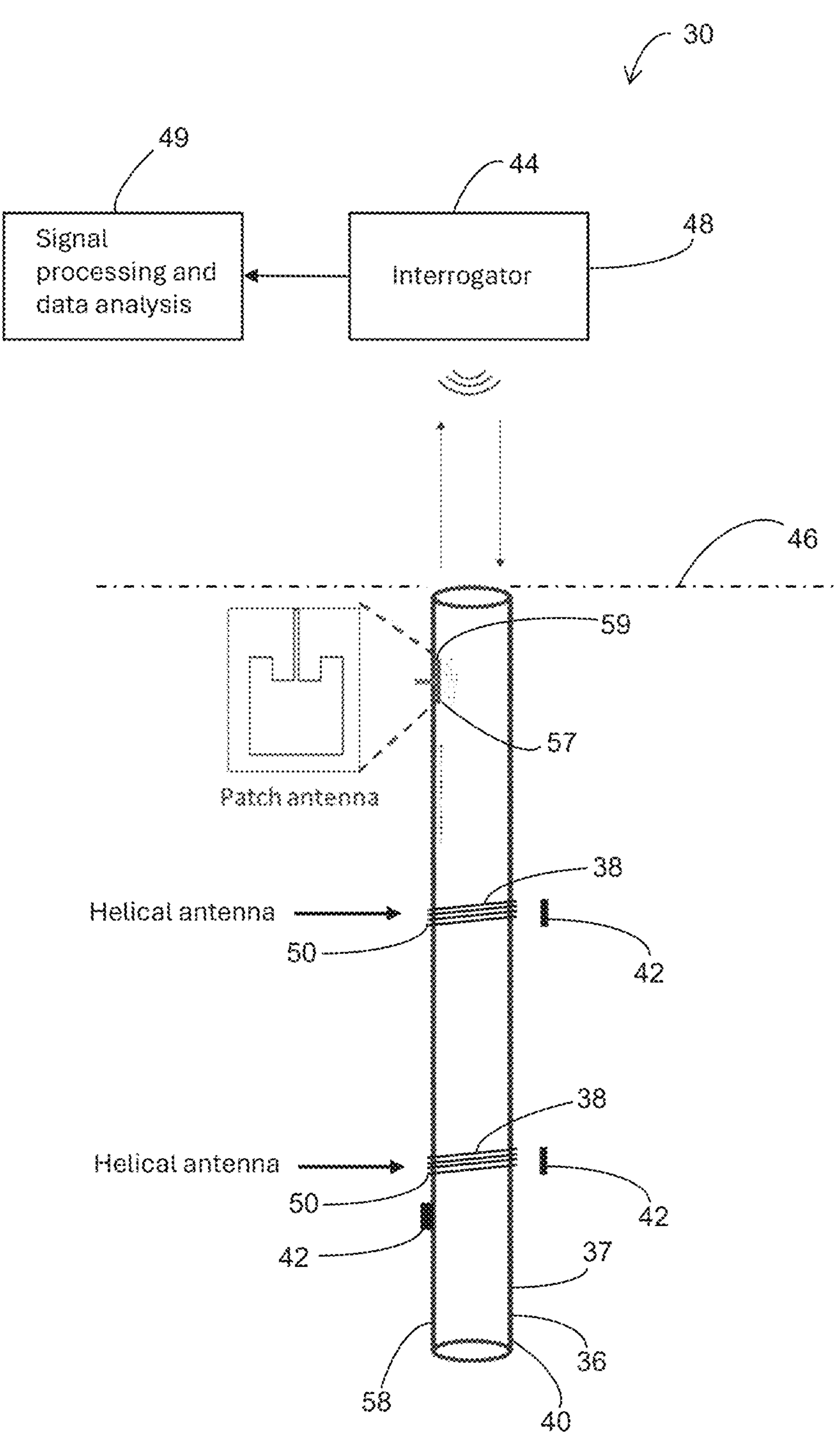
FIG. 2 is a distributed electromagnetic interrogation system for interrogating an underground environment including an interrogator and a signal processor located aboveground, according to embodiments of the invention.

Referring now to FIG. 2, a distributed electromagnetic interrogation system 30 having a source of electromagnetic energy 44 positioned above or near ground level 46 is shown, according to embodiments of the invention. The source of electromagnetic energy 44 is operable for transmitting electromagnetic energy signals to helical antennas 38 distributed along a wellbore casing 36. The helical antennas 38 are mounted coaxially on the wellbore casing 36 and configured for efficient delivery of the RF radiation to the wireless sensors 42. The wireless sensors 42 are mounted on an exterior surface of the wellbore casing 36 and/or distributed throughout wellbore cement.

The source of electromagnetic energy 44 may comprise an interrogator 48 that provides electromagnetic energy in the radio or microwave frequency range to the helical antennas 38, with the wellbore casing 36 providing a waveguide 37 for the electromagnetic radiation to the helical antennas 38. An electromagnetic coupling 57 may be positioned in the wellbore casing 36 in wired or wireless communication with the interrogator 48. The electromagnetic coupling 57 may include an antenna 59 (e.g. a patch antenna) to launch electromatic signals to the helical antennas 38 and to receive electromagnetic signals therefrom using the wellbore casing 36 as a waveguide 37. According to embodiments of the invention, the electromagnetic coupling 57 couples to the helical antennas 38 via the internal guided modes of the wellbore casing 36.

According to embodiments of the invention, the interrogator 48 is coupled to receive data from the helical antennas 38 via the electromagnetic coupling 57. The wireless sensors 42 re-emit electromagnetic energy to the helical antennas 38, and the helical antennas 38 transmit data on the re-emitted electromagnetic energy to the interrogator 48, according to embodiments of the invention. The interrogator 48 can directly process data from the helical antennas 38 and/or a signal analyzer 49 may be in data connection with the helical antennas 38 to process the data. The signal analyzer 49 may be in data communication with the interrogator 48 but could be a component of the interrogator 48.

As referred to previously, the helical antennas 38 may be coupled to an external propagating mode of the wellbore casing 36. Helical antennas 38 can be tailored for both desired frequency and directionality of the free space coupled electromagnetic energy. Thus, efficient coupling of the radiation to the propagating mode of the wellbore casing 36 is possible and the helical antennas 38 can be designed for a desired RF frequency.

The wellbore casing 36 may be a cylindrical structure 58 that supports internal as well as external transverse electromagnetic (TEM) propagating modes. The electromagnetic end-fire emission of helical antennas 38 on top of the cylinder 58 is considered a coupling between the helical EM current source on the surface of the cylinder and the external TEM mode of the cylinder. To induce efficient coupling the phase relation between the EM currents in neighboring turns of the helical antenna 38 correspond to the phase relation of the TEM wave traveling with a velocity $v \approx v_0$. The external TEM mode propagation is bidirectional which permits coupling of forward and reverse propagating waves to the helical antennas 38. According to embodiments of the invention, for example, since the microstrip mode traveling around the cylinder 58 is inherently slower than the TEM wave traveling in the same direction, selection is chosen to induce coupling to the backward propagating wave. The phase matching condition becomes:

$$\frac{n \cdot S}{\lambda_0} = 1 - \frac{n \cdot L_0 \cdot \sqrt{e_{eff}}}{\lambda_0} \tag{1}$$

Where $L_0 = \sqrt{C^2 + S^2}$, C and S are the circumference of a single loop and the spacing between helical turns, respectively, and n is the number of turns (n may equal 1 for initial design purposes). The left-hand side of equation (1) corresponds to the fractional phase shift of the external TEM mode and the right-hand side is a phase shift of the microstrip EM current in the helical antenna 38.

According to embodiments of the invention, the design frequency is $f_0$=3.35 GHz with corresponding $\lambda_0$=8.95 cm. For example, the electromagnetic coupling between the helical antennas 38 and the wellbore casing 36 may have a resonant frequency of approximately 3.35 GHz. The frequency readily applies to several existing microwave sensing technologies such as wireless solid-state sensors and surface acoustic wave sensors. However, lower frequency interrogation is possible through modified antennae dimensions, cylinder geometries, material properties, etc.

Figure 3:
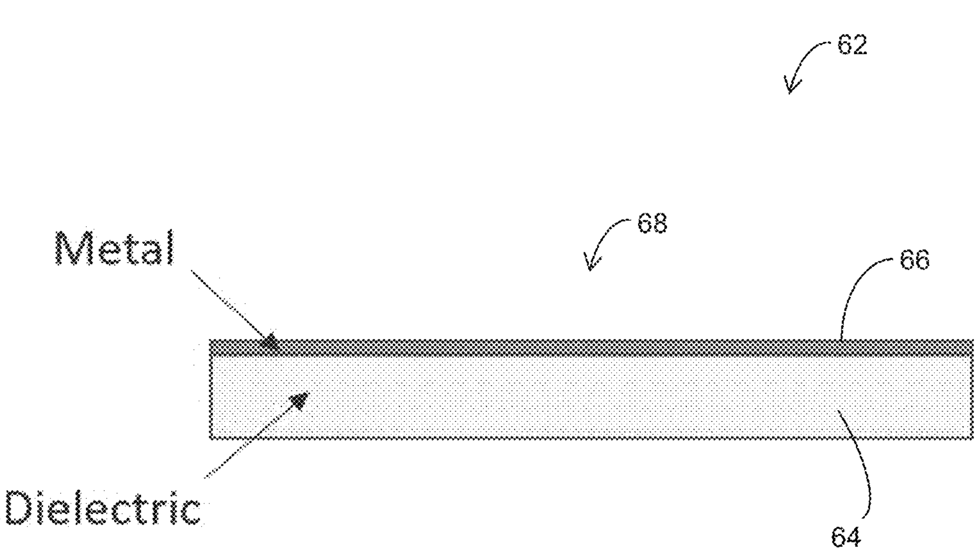
FIG. 3 is a microstrip waveguide antenna, according to embodiments of the invention.

Referring now to FIG. 3, a microstrip waveguide antenna 62 is shown, according to embodiments of the invention. The microstrip waveguide antenna 62 is formed from a metal-dielectric tape 68 having a dielectric layer 64 and a metal tape layer 66. Metal-dielectric tape 68 attached to an internal or external surface of metallic tubing provides a low-loss RF telemetry channel along the tubing. Each of the helical antennas 38 (FIG. 2) may include a microstrip waveguide antenna 62 mounted on an external surface of the steel wellbore casing 36 (FIG. 2), with the dielectric layer 64 sandwiched between the metal tape layer 66 and the wellbore casing 36 (FIG. 2).

The microstrip waveguide antenna 62 confines RF energy to a thin dielectric region sandwiched between two metal regions, i.e. outer surface of the wellbore casing 36 (FIG. 2) and the metal tape layer 66. This topology provides a thin helical antenna 38 (FIG. 2) mounted on the wellbore casing 36 (FIG. 2) having a low profile that can minimize material losses in wellbore cement and surrounding formations. Several advantages of this approach include ease of integration with existing well-drilling practices (with embodiments of the invention only requiring thin metal-dielectric film tape with a low profile that can be attached to the casing on-site before downhole placement), no required dedicated telemetry channel in the cement since the casing provides a waveguide from a source of electromagnetic energy at the surface, and a simple inexpensive fabrication process for metal-dielectric tapes 68. Low loss of electromagnetic propagation on the order of 5-6 dB/km has been calculated analytically according to embodiments of the invention.

Figure 4:
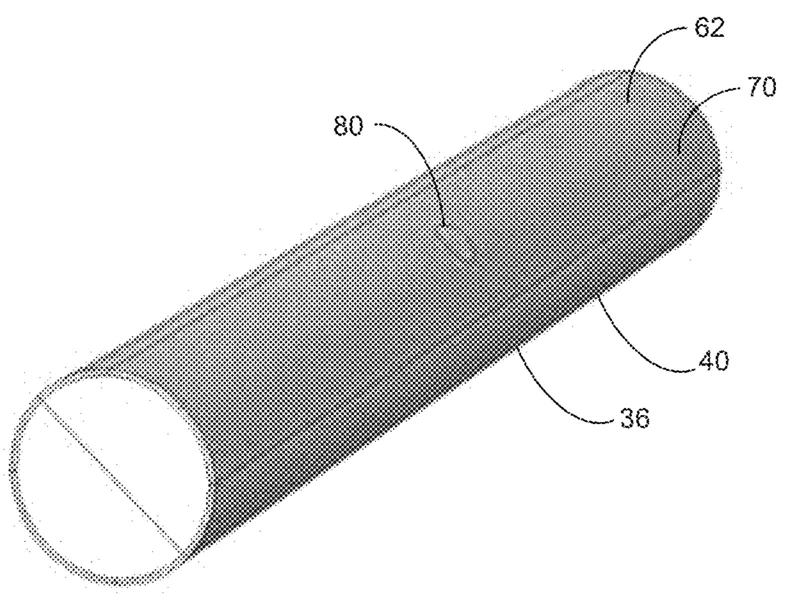
FIG. 4 is a microstrip waveguide aperture antenna mounted lengthwise on an outer surface of a metallic tube, according to embodiments of the invention.

Referring now to FIG. 4, a microstrip waveguide antenna 62 mounted lengthwise on the outer surface of a metallic tube 40 (e.g. wellbore casing 36) is shown, according to embodiments of the invention. The microstrip waveguide antenna 62 is mounted on the wellbore casing 36 in various positions (e.g. lengthwise, crosswise, or angled) and may include a circular aperture antenna 70 mounted on the wellbore casing 36. The size and shape of the aperture 80 (rectangular, circular, slot, etc.) can be adjusted to achieve desired beam radiation pattern and center frequency/bandwidth parameters. Each microstrip waveguide antenna 62 may be connected to a source of electromagnetic energy via the internal guided modes of the wellbore casing 36, and each microstrip waveguide antenna 62 may receive and radiate the electromagnetic energy via the external guided modes of the wellbore casing 36 to the subsurface environment and receive re-emitted electromagnetic energy therefrom. As used herein, the terms internal guided modes and external guided modes refer to one or more internal guided modes and one or more external guided modes, respectively.

As described above, RF interrogation using the microstrip waveguide antennas 62 can provide an RF radar source for subsurface imaging in near-field regimes for use in wellbores and geothermal sites. In addition to wellbore sensing networks, additional applications for distributed electromagnetic interrogation include industrial sensing networks (process sensing in chemical plants, deployment in industrial harsh environments, etc.), nuclear energy and fossil fuel power plants, structural sensing in large infrastructure projects (bridges, dams, etc.), aircraft/spacecraft as well as smart home/internet of things applications. For example, embodiments of the invention are used in aircraft as conformal antennas for radar applications. As described in more detail below, microstrip waveguide antennas 62 can be used as direct sensors of environmental parameters such as permittivity, humidity, and temperature.

Figures 5A, 5B, 5C:
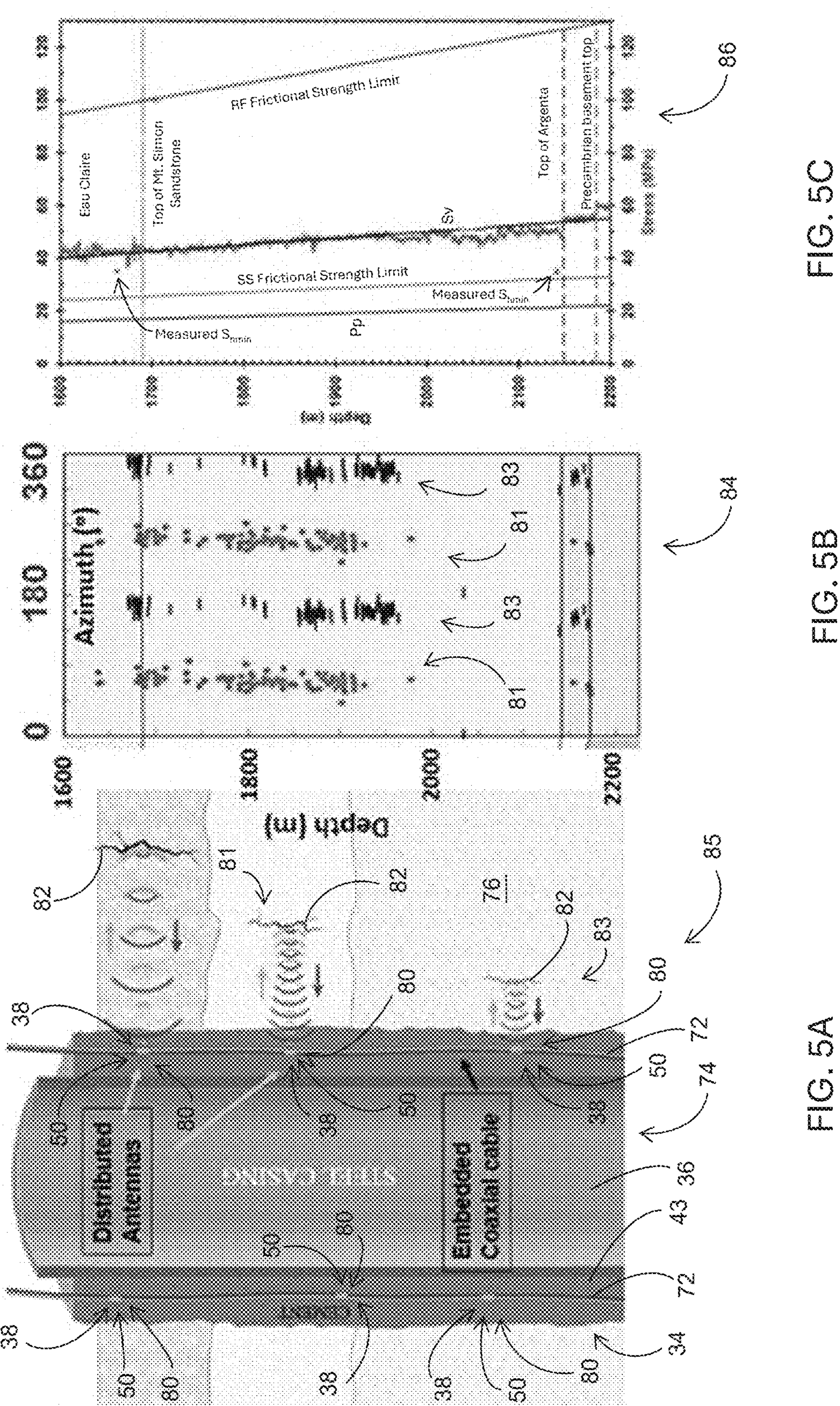
FIG. 5A is an in-situ EM monitoring system with helical antennas mounted on coaxial cables in a wellbore to provide direct imaging of an underground environment, according to embodiments of the invention.
FIG. 5B is an exemplary plot of drilling-induced tensile fractures and wellbore breakouts that could be interpreted from the system of FIG. 5A, according to embodiments of the invention.
FIG. 5C is a stress profile of an underground environment determined from the plot of FIG. 5B, according to embodiments of the invention.

Referring now to FIG. 5A, an in-situ EM monitoring system 85 using helical antennas 38 mounted on coaxial cables 72 in a borehole 34 to provide direct imaging of the subsurface environment is shown, according to embodiments of the invention. Helical antennas 38 may be wound on coaxial cables 72 and distributed down a borehole 34 to radiate EM energy for direct subsurface imaging (e.g. without additional external sensors). The helical antennas 38 allow the coupling of conventional internal coaxial mode to the external coaxial mode for wireless remote energy/signal delivery, which would enable focusing telemetry signals in harsh environments including, for example, wellbore cement 43. In addition, helical antennas 38 coupled to the external propagating mode of the coaxial cable 72 allow for direct subsurface imaging beyond the range of surface-based systems using electromagnetic frequencies that offer high resolution but suffer from limited penetration depth.

With respect to equation (1) above, geometrical parameters were set to $C=2\pi r=1.53\cdot\lambda_0$, $S=0.1508\cdot\lambda_0$, according to embodiments of the invention. The effective permittivity, $e_{eff}$ of the helical antenna 38 was modeled to be that of a planar microstrip with width (W)/Height (H)>1 (for example, W=0.8 mm and H=0.5 mm). Equation (1) was used to determine $e_{eff}=1.607$ and by solving the implicit equation:

$$e_{eff} = \frac{e_{sub}+1}{2} + \frac{e_{sub}-1}{2}\left(1+12\frac{W}{H}\right)^{-1/2} \quad (2)$$

the substrate permittivity $e_{sub}=1.907$ was determined. The parameter values produced an effective phase between EM currents in neighboring turns of $\varphi=53°$.

The number of turns for the helical antenna 38 was set to N=7, according to embodiments of the invention. This corresponds to the total length of the helix being $L=N\cdot S=1.05\cdot\lambda_0$ and approximately equal to one period, which ensures even excitation of all temporal phases. Proof of concept modeling was performed using a commercial finite element method implemented in COMSOL Multiphysics® to estimate antenna local fields, far field parameters and corresponding S-parameters. Matching of the antenna emission to the external mode of the coaxial cable 72 was obtained. Resonant frequency of the coupling was determined to be $f_0=3.38$ GHz which exhibits two end-fire radiation peaks without any nulls in the axial direction. Electric field distribution showing the propagating external mode confined to a coaxial cable was observed in the model. For comparison, a simulation was performed of the radiation pattern at a frequency where the phase matching condition is not fulfilled, and an absence of coupling to propagating axial mode was indicated by axial nulls in the radiation pattern. This corresponds to the case of regular free-space antennas.

FIG. 5A shows conformal helical antennas 38 on the coaxial cables 72 as direct EM imaging units 80 to provide in-situ distributed EM imaging for continuous real-time monitoring of the rock stress state for km-range depth in the geothermal wells 74, according to embodiments of the invention. Drilling-induced tensile fractures 81 (DITFs) and wellbore breakouts 83 (WBOs) are wellbore failures 82 interpreted to have occurred as a result of drilling, and their azimuth in the wellbore 34 is typically measured to estimate in-situ principal horizontal stress directions in wellbores 34. DITFs form in the directions of the maximum principal horizontal stress ($S_{Hmax}$) and WBOs form in the directions of the minimum principal horizontal stress ($S_{hmin}$) where the stress concentration exceeds the rock tensile strength. Therefore, EM imaging on wellbore fractures can be interpreted to characterize the stress state as represented in FIGS. 5A-C. Wellbore failure plots 84 include measurements of WBOs and DITFs interpreted from well-logging tools as shown in FIG. 5B. Stress profile 86 includes estimated ranges of principal horizontal stresses, overburden stress, vertical stress ($S_v$), hydrostatic pore pressure ($P_p$), and frictional strength limits of the crust in a reverse faulting (RF) and strike slip (SS) faulting regime as shown in FIG. 5C.

While FIG. 5A shows the helical antennas 38 wound on a coaxial cable, the helical antennas 38 could be wound on the wellbore casing 36 to provide in-situ distributed EM imaging for continuous real-time monitoring of the rock stress state at km-range depth in the geothermal wells 74, according to embodiments of the invention. The wellbore casing 36 could be used as a waveguide in place of the coaxial cable 72 and the helical antennas 38 allow coupling to the external propagating mode of the wellbore casing 36 to radiate EM energy for direct imaging of geological conditions surrounding the wellbore. For example, the helical antennas 38 may provide direct interrogation of surrounding environmental conditions without use of additional sensors. Thus, the helical antennas 38 (e.g. helical microstrip antennas 50) may be wound directly on the wellbore casing 36 to monitor wellbore failures 82 (e.g. WBOs and DITFs) and estimate in-situ principle horizontal stress state of rock 76 surrounding the borehole 34.

Figure 6:
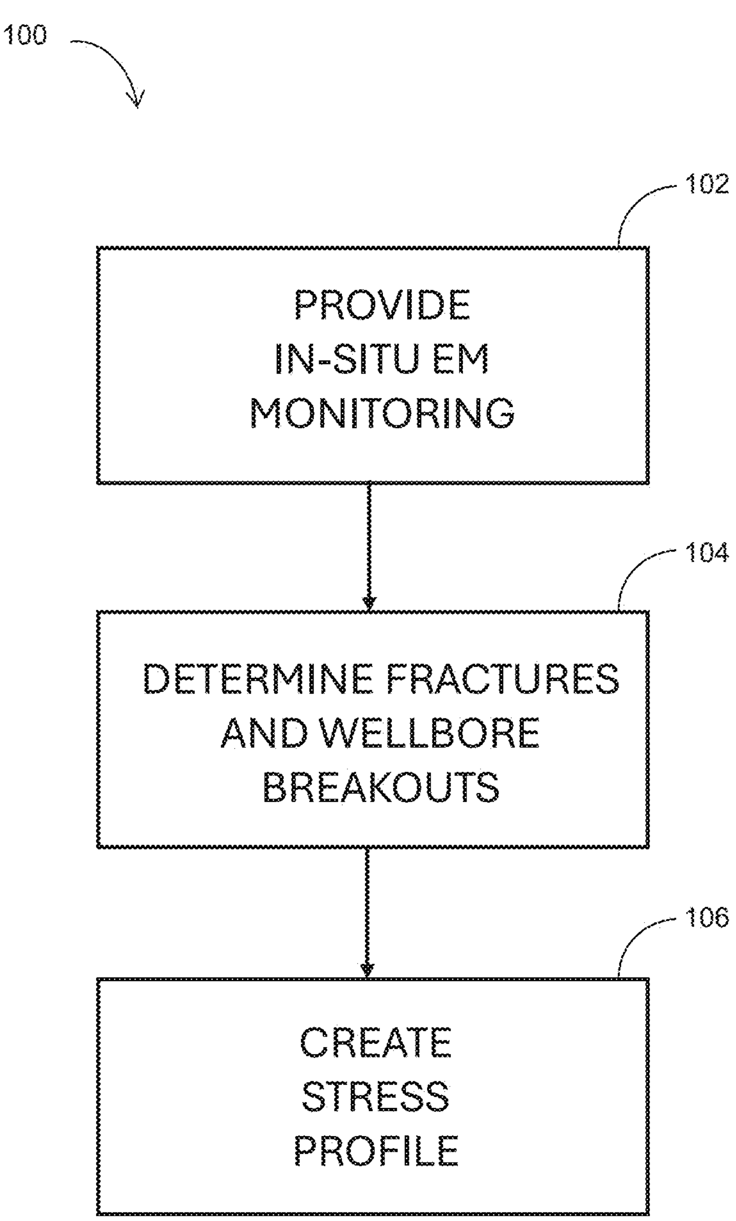
FIG. 6 is a flow chart of an in-situ EM-based sensor technique to monitor and characterize stress state of a subsurface environment in real-time, according to embodiments of the invention.

Referring now to FIG. 6 with continued reference back to FIGS. 2 and 5A-C a flow chart of an in-situ EM-based sensor process 100 used to monitor and characterize stress state of a subsurface environment in real-time is shown, according to embodiments of the invention. The process 100 begins at STEP 102 by providing in-situ EM monitoring of the subsurface environment. In-situ EM monitoring is provided by a distributed electromagnetic interrogation system 30 that includes a metallic tube 40 extending down the borehole 34, and a plurality of helical antennas 38 distributed along the metallic tube 40 and connected to a source of electromagnetic energy 44. The helical antennas 38 are configured to radiate electromagnetic energy to the subsurface environment and receive re-emitted electromagnetic energy indicative of geological conditions in the subsurface environment. Process 100 continues at STEP 104 by determining the presence of DITFs 81 and WBOs 83 using data received from the helical antennas 38. Wellbore failure plots 84 show measurements indicating the position of DITFs 81 and WBOs 83 interpreted from well-logging tools. Process 100 completes at STEP 106 by creating a stress profile 86 of an underground environment determined from the wellbore failure plots 84. For example, stress profile 86 includes estimated ranges of principal horizontal stresses, overburden stress, vertical stress (Sv), hydrostatic pore pressure (Pp), and frictional strength limits of the crust in a reverse faulting (RF) and strike slip (SS) faulting regime.

Embodiments of the invention have several advantages over existing well-logging technologies including providing spatially distributed km-range telemetry for subsurface EM sensing networks compared to limited penetration depths of tens of meters for ground penetrating radar (GPR), continuous real-time in-situ monitoring compared to one-time well logging tools, tunable EM frequencies of in-situ and real-time subsurface radar for increased penetrating ranges from the borehole and into the geothermal reservoir. The helical antennas 38 may provide local permittivity probes capable of detecting environmental changes in the wellbore 34, such as increases in water content in wellbore cement 43 and surrounding formations.

Beneficially, embodiments of the invention include conformal helical antennas mounted coaxially on a cylindrical structure for distributed electromagnetic interrogation in wellbore applications. A wellbore casing acts as a waveguide allowing deeper penetration in underground environments that have high EM attenuation without compromising resolution and operating frequency and providing efficient coupling to external sensors by confining EM radiation to the vicinity of wellbore casing. The conformal helical antennas provide minimal added form factor for easier integration into the well and provide real-time imaging information of geological structure in the immediate vicinity of the well at a continuous sampling rate and high resolution.

Therefore, according to one embodiment of the invention, a distributed electromagnetic interrogation system includes a wellbore, a wellbore casing positioned in the wellbore, and a plurality of conformal helical antennas distributed along the wellbore casing. The plurality of conformal helical antennas may be configured to operate in a radio or microwave frequency range and to propagate electromagnetic radiation along an external propagating mode of the wellbore casing. An interrogator may be coupled to receive and process data from the plurality of conformal helical antennas.

According to another embodiment of the invention, a system for interrogating an underground environment includes a borehole, a metallic tube extending down the borehole, a plurality of microstrip antennas mounted on and distributed along the metallic tube, a plurality of wireless sensors distributed down the borehole, and a source of electromagnetic energy positioned above or near ground level and operable for transmitting electromagnetic energy to the plurality of microstrip antennas. The plurality of microstrip antennas may radiate the electromagnetic energy to interrogate the plurality of wireless sensors, with the plurality of wireless sensors re-emitting the electromagnetic energy to the plurality of microstrip antennas. The plurality of microstrip antennas may transmit data on the re-emitted electromagnetic energy to the source.

According to yet another embodiment of the invention, a system for interrogating a subsurface environment includes a casing lined borehole, a source of electromagnetic energy positionable aboveground and operable for generation of an electromagnetic energy signal, and a plurality of microstrip antennas mounted on the outer surface of the casing and connected to the source of electromagnetic energy via the internal guided modes of the casing. The plurality of microstrip antennas may be configured to receive and radiate the electromagnetic energy signal via the external guided modes of the casing to the subsurface environment and receive re-emitted electromagnetic energy therefrom, and a signal analyzer may be in data connection with the plurality of microstrip antennas.

The following publication is incorporated herein by reference in its entirety: Shugayev, R., Devkota, J. & Ohodnicki, P., (2019) "Conformal coaxial helical antenna for distributed sensing applications at wellbores", *Review of Progress in Quantitative Nondestructive Evaluation*. The following publication is also incorporated herein by reference in its entirety: Babarinde, O., Okwen, R., Frailey, S., Yang, F., Whittaker, S., & Sweet, D. (2021) "A workflow to assess the efficacy of brine extraction for managing injection-induced seismicity potential using data from a $CO_2$ injection site near Decatur, Illinois", *International Journal of Greenhouse Gas Control,* 109, Article 103393.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A distributed electromagnetic interrogation system comprising:

a wellbore;

a wellbore casing positioned in the wellbore;

a plurality of conformal helical antennas distributed along the wellbore casing, wherein the plurality of conformal helical antennas are configured to operate in a radio or microwave frequency range, wherein the plurality of conformal helical antennas propagate electromagnetic radiation along an external propagating mode of the wellbore casing; and an interrogator coupled to receive data from the plurality of conformal helical antennas, wherein said interrogator processes the data; and wherein each of the plurality of conformal helical antennas are coupled to the external propagating mode of the wellbore casing according to:

$$\frac{n \cdot S}{\lambda_0} = 1 - \frac{n \cdot L_0 \cdot \sqrt{e_{eff}}}{\lambda_0}.$$

2. The distributed electromagnetic interrogation system of claim 1 wherein each of the plurality of conformal helical antennas comprises a microstrip waveguide having a dielectric layer and a metal tape layer, the dielectric layer sandwiched between the metal tape layer and the wellbore casing.

3. The distributed electromagnetic interrogation system of claim 1 wherein the interrogator provides electromagnetic energy in the radio or microwave frequency range to the plurality of conformal helical antennas via an internal propagating mode of the wellbore casing.

4. The distributed electromagnetic interrogation system of claim 1 wherein the plurality of conformal helical antennas provides direct electromagnetic imaging of geological conditions surrounding the wellbore.

5. The distributed electromagnetic interrogation system of claim 1 further comprising:

wellbore cement surrounding the wellbore casing in the wellbore; and a plurality of sensors embedded into the wellbore cement;

wherein the plurality of sensors are passive and wireless, wherein the propagated electromagnetic radiation excites and interrogates the plurality of sensors, wherein the plurality of sensors re-emits electromagnetic radiation, and wherein the plurality of conformal helical antennas receives the re-emitted electromagnetic radiation.

6. The distributed electromagnetic interrogation system of claim 1 wherein the electromagnetic coupling between the plurality of conformal helical antennas and the wellbore casing has a resonant frequency of approximately 3.35 GHz.

7. The distributed electromagnetic interrogation system of claim 1 wherein the plurality of conformal helical antennas provide direct interrogation of surrounding environmental conditions.

8. A system for interrogating an underground environment comprising:

a borehole;

a metallic tube extending down the borehole;

a plurality of microstrip antennas mounted on and distributed along the metallic tube;

a plurality of wireless sensors distributed down the borehole; and a source of electromagnetic energy positioned above or near ground level and operable for transmitting electromagnetic energy to the plurality of microstrip antennas;

wherein the plurality of microstrip antennas radiate the electromagnetic energy to interrogate the plurality of wireless sensors, wherein the plurality of wireless sensors re-emit the electromagnetic energy to the plurality of microstrip antennas, and wherein the plurality of microstrip antennas transmits data on the re-emitted electromagnetic energy to the source.

9. The system for interrogating an underground environment of claim 8 wherein the plurality of microstrip antennas are coupled to an external propagating mode of the metallic tube to radiate the electromagnetic energy to the plurality of wireless sensors.

10. The system for interrogating an underground environment of claim 8 wherein the metallic tube is a steel wellbore casing.

11. The system for interrogating an underground environment of claim 10 further comprising wellbore cement in the borehole surrounding the wellbore casing;

wherein each of the plurality of wireless sensors are embedded in the wellbore cement.

12. The system for interrogating an underground environment of claim 10 wherein each of the plurality of microstrip antennas comprises metal-dielectric tape mounted on an external surface of the steel wellbore casing.

13. The system for interrogating an underground environment of claim 8 wherein at least one of the plurality of wireless sensors is mounted on an exterior surface of the metallic tube.

14. The system for interrogating an underground environment of claim 8 wherein the plurality of wireless sensors comprises SAW sensors, solid state sensors, or microwave resonant sensors.

15. A system for interrogating a subsurface environment comprising:

a casing lined borehole;

a source of electromagnetic energy positionable aboveground and operable for generation of an electromagnetic energy signal;

a plurality of microstrip antennas mounted on the outer surface of the casing and connected to the source of electromagnetic energy via the internal guided modes of the casing, the plurality of microstrip antennas configured to receive and radiate the electromagnetic energy signal via the external guided modes of the casing to the subsurface environment and receive re-emitted electromagnetic energy therefrom; and a signal analyzer in data connection with the plurality of microstrip antennas.

16. The system for interrogating a subsurface environment of claim 15 further comprising:

wellbore cement in the borehole around the casing; and a plurality of wireless sensors embedded in wellbore cement within the borehole, the plurality of wireless sensors comprising passive resonating circuits that modulate the electromagnetic energy signal in response to an environmental condition in the subsurface environment and re-emits the modulated electromagnetic energy to the plurality of microstrip antennas.

17. The system for interrogating a subsurface environment of claim 15 wherein the plurality of microstrip antennas are distributed along the casing to at least one kilometer below ground level.

18. The system for interrogating a subsurface environment of claim 15 wherein the plurality of microstrip antennas monitor wellbore failures to estimate in-situ principle horizontal stress state of rock surrounding the borehole.

19. The system for interrogating a subsurface environment of claim 18 wherein the wellbore failures include one or more of drilling induced tensile fractures and wellbore breakouts.

* * * * *